(12) United States Patent
Woelk

(10) Patent No.: US 10,864,559 B2
(45) Date of Patent: Dec. 15, 2020

(54) APPARATUS AND METHODS TO PREVENT BIOFOULING

(71) Applicant: Innovent Technologies, LLC, Peabody, MA (US)

(72) Inventor: Egbert Woelk, Peabody, MA (US)

(73) Assignee: INNOVENT TECHNOLOGIES, LLC, Peabody, MA (US)

( * ) Notice: Subject to any disclaimer, the term of this patent is extended or adjusted under 35 U.S.C. 154(b) by 49 days.

(21) Appl. No.: 16/131,617

(22) Filed: Sep. 14, 2018

(65) Prior Publication Data

US 2019/0084015 A1 Mar. 21, 2019

Related U.S. Application Data

(60) Provisional application No. 62/559,971, filed on Sep. 18, 2017.

(51) Int. Cl.
| | |
|---|---|
| *B08B 7/00* | (2006.01) |
| *G03B 17/08* | (2006.01) |
| *G02B 27/00* | (2006.01) |
| *B08B 17/02* | (2006.01) |
| *G02B 19/00* | (2006.01) |
| *G03B 15/03* | (2006.01) |

(52) U.S. Cl.
CPC ............ *B08B 7/0057* (2013.01); *B08B 17/02* (2013.01); *G02B 19/0095* (2013.01); *G02B 27/0006* (2013.01); *G03B 15/03* (2013.01); *G03B 17/08* (2013.01); *G03B 2215/0567* (2013.01)

(58) Field of Classification Search
CPC ... B08B 7/0057; B08B 17/02; G02B 19/0095; G02B 27/0006; G03B 15/03; G03B 17/08; G03B 2215/0567

USPC ... 250/432 R, 453.11, 454.11, 455.11, 504 R
See application file for complete search history.

(56) References Cited

U.S. PATENT DOCUMENTS

| | | | |
|---|---|---|---|
| 5,929,453 A | 7/1999 | Andrews et al. | |
| 9,235,048 B2 | 1/2016 | Farr et al. | |
| 9,346,687 B1 * | 5/2016 | Matthews | ............... C02F 1/325 |
| 2012/0050520 A1 * | 3/2012 | Thoren | ................... B63B 59/08 |
| | | | 348/81 |

(Continued)

OTHER PUBLICATIONS

International Search Report and Written Opinion—PCT/US2018/051142—ISA/EPO—Nov. 26, 2018.

(Continued)

*Primary Examiner* — Nicole M Ippolito
(74) *Attorney, Agent, or Firm* — Hunter Clark PLLC

(57) ABSTRACT

Techniques for reducing biofouling on optical equipment, using minimum power in a marine environment are provided. An example of an apparatus according to the disclosure includes a housing including a cavity and an ultraviolet transparent window disposed over the cavity, an optical device disposed in the cavity and directed towards the ultraviolet transparent window, one or more ultraviolet light emitting diodes disposed in the cavity and directed towards the ultraviolet transparent window, and a controller operably coupled to the one or more ultraviolet light emitting diodes and configured to provide at least one lamp power function to the one or more ultraviolet light emitting diodes, wherein the at least one lamp power function is based on at least a flash power value, a flash duration, a rest power value and a rest duration.

20 Claims, 6 Drawing Sheets

(56) References Cited

U.S. PATENT DOCUMENTS

| | | |
|---|---|---|
| 2014/0277299 A1* | 9/2014 | Intintoli ............... A61N 5/0616 |
| | | 607/94 |
| 2015/0340539 A1* | 11/2015 | Koyama ........... H01L 31/02240 |
| | | 257/43 |
| 2015/0363914 A1 | 12/2015 | Boyle et al. |
| 2016/0089458 A1 | 3/2016 | Liao et al. |
| 2017/0053391 A1 | 2/2017 | Bonheyo et al. |
| 2017/0059741 A1 | 3/2017 | Olsen |
| 2017/0199463 A1* | 7/2017 | Owada ................ G03F 7/70933 |

OTHER PUBLICATIONS

De, et al., "Image Sharpness Measure for Blurred Images in Frequency Domain," ScienceDirect, Procedia Engineering 64 (2013) 149-158.

\* cited by examiner

APPARATUS AND METHODS TO PREVENT BIOFOULING

CROSS-REFERENCE TO RELATED APPLICATIONS

This application claims the benefit of U.S. Provisional Application No. 62/559,971, filed Sep. 18, 2017, entitled "APPARATUS AND METHOD TO PREVENT BIOFOULING," the entire contents of which is hereby incorporated herein by reference.

BACKGROUND

The biofouling of materials used in marine environments has been a problem to naval operations for millennia. Generally, "biofouling" refers to the accumulation of microorganisms, plants, algae, or animals on surfaces. Historically, methods to reduce or eliminate biofouling involved the use of biocidal compounds in paints or other coatings applied to exposed surfaces. Such coatings wear off over time and are subject to spallation, cracking and other imperfections, and are not suitable for many applications.

More recently, an increasing number of optical sensors and cameras are being used to research the underwater environment. These sensors and cameras require windows that stay substantially clear and free from biofouling for long periods of time without mechanical cleaning. Painting or coating the surface is not an option for this application because of the need for light passage through the windows.

The recent development of ultra violet (UV) light emitting diodes (UV LEDs), such as those comprising aluminum nitride, have made available the option to use generated UV light to kill microbes on and near surfaces to be protected against biofouling. There are commercial apparatuses on the market that irradiate underwater surfaces with UV light, such as those described in Http://www.amloceanographic.com/CTD-Sound-Velocity-Environmental-Instrumentation-Home/Biofouling. Another example of the use of UV light to prevent biofouling is described in U.S. Pat. No. 9,235,048 and related US Publication No. 2016/0121009, which are hereby incorporated by reference for all purposes. Notably, most of the UV light sources used with these apparatuses are situated outside of their housings, such that the light source is positioned in front of the window such that water is within the space between the light source and the window. As such, the light sources may at least partly obstruct the view. Moreover, parts of the window may also be in the shade of mounting brackets used in these apparatuses, and biofouling may still occur in these shadowed areas. In addition, the UV intensity may be attenuated by travelling through the water. Finally, it is often challenging to deliver power to such apparatuses in offshore underwater environments, and conventional apparatuses are not generally designed to reduce power consumption. As such, one of the advantages of the present invention is to reduce biofouling through the effective delivery of UV light using minimal electrical power.

SUMMARY

An example of a method for reducing biofouling in a marine environment according to the disclosure includes disposing an optical device in the marine environment, wherein the optical device is directed at an object in the marine environment, obtaining an image of the object with the optical device, determining a quality of the image, determining a UV flash power value and a UV flash duration based on the quality of the image, determining a rest power value and a rest duration based on the quality of the image, and activate at least one ultraviolet light source for a plurality of cycles based on the flash power value, the flash duration, the rest power value and the rest duration, such that the at least one ultraviolet light source is disposed proximate to the optical device and directed at the object. As used herein, the term flash refers to a flash of UV light.

Many technical papers distinguish between UV power at the wavelength of the LED and the electrical power required to generate this UV power. In general, an electrical-to-UV-C conversion efficiency of 1% is attained with current LED technologies. In an effort to reduce ambiguity, power specifications used herein are labeled with electrical or UV units.

Implementations of such a method may include one or more of the following features. At least one ultraviolet light source may be characterized by emission wavelength of between 250 nanometers and 400 nanometers. The flash duration may be between 0.01 seconds and 1000 seconds. The flash power value may be between 1 milliwatt (UV) and 100 milliwatts (UV). The rest power value may be less than 1 milliwatt. The rest duration may be between 1 second and 100,000 seconds. The flash power value may be approximately 12.5 milliwatts (UV), the flash duration may be approximately 0.1 seconds, the rest power value may be less than 0.001 milliwatts, and the rest duration may be approximately 19.9 seconds. Determining the quality of the image may be based on a sharpness value associated with a contrast boundary in the image. The flash power value, the flash duration, the rest power value and the rest duration may be provided to a server. The flash power value, the flash duration, the rest power value and the rest duration may be received from a server.

An example of an apparatus for reducing biofouling in a marine environment according to the disclosure includes a housing including a cavity and an ultraviolet transparent window disposed over the cavity, an optical device disposed in the cavity and directed towards the ultraviolet transparent window, one or more ultraviolet light emitting diodes disposed in the cavity and directed toward the ultraviolet transparent window, and a controller operably coupled to the one or more ultraviolet light emitting diodes and configured to provide at least one lamp power function to the one or more ultraviolet light emitting diodes, wherein at least one lamp power function is based on at least a flash power value, a flash duration, a rest power value and a rest duration. A lamp power function is the representation of the electrical power applied to the UV LED over time.

Implementations of such an apparatus may include one or more of the following features. The ultraviolet transparent window may be constructed at least in part with at least one material selected from a group consisting of sapphire, silicon carbide (SiC), diamond, zinc sulfide (ZnS), zinc selenide (ZnSe), Barium fluoride (BaF2), aluminum dioxide (Al2O3), quartz (SiO2), and magnesium fluoride (MgF2). At least one of the one or more ultraviolet light emitting diodes may be characterized by emission wavelengths between 250 nanometer and 400 nanometers. A power source may be operably coupled to the one or more ultraviolet light emitting diodes. The controller may be configured to receive the at least one lamp power function from a remote server. The controller may include at least one data structure configured to store the at least one lamp power function. The flash duration may be between 0.01 seconds and 1000 seconds and the flash power value may be between 1 milliwatt (UV) and 100 milliwatts (UV). The rest power value may be less than 10 milliwatts and the rest duration may be between 1 second and 100,000 seconds. The flash power value may be approximately 12.5 milliwatts (UV), the flash duration is approximately 0.1 seconds, the rest power value may be less than 0.001 milliwatts (UV), and the rest duration is approximately 19.9 seconds.

An example of an apparatus according to the disclosure includes a housing means including a cavity configured to enclose one or more optical device means and one or more ultraviolet light emitting means, an ultraviolet transparent window means disposed on the housing means over the cavity, such that the one or more optical device means and the one or more ultraviolet light emitting means are directed towards the ultraviolet transparent window means, and a controller means operably coupled to the one or more ultraviolet light emitting means and configured to provide at least one lamp power function to the one or more ultraviolet light emitting means, such that the at least one lamp power function is based on at least a flash power value, a flash duration, a rest power value and a rest duration.

Items and/or techniques described herein may provide one or more of the following capabilities, as well as other capabilities not mentioned. An optical sensing device may be placed behind a window in a marine environment. The window may be a transparent or semi-transparent component through which light is passed. An ultraviolet (UV) light source may be directed at the window. The UV light may impede the growth of marine algae on the window. A programmable controller may be operably coupled to the UV light source and configured to cyclically activate the UV light source using two or more periods at varying power levels. A cycle may include a short high-power UV light flash, followed by a relatively longer period of relatively low power UV light or no UV light. The cyclical operation may reduce the power consumed by the controller. The reduced power consumption may extend the operational service life of the optical sensing device. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Techniques are discussed herein for extending the service life of optical sensors in a marine environment. For example, an optical sensor may be disposed in an apparatus that includes a window used for underwater applications. The container and window may be operable under a pressure of up to 10,000 m of water. A method to keep the window substantially clear and free from biofouling includes using two or more periods of UV radiation with varying power. The sequence of these periods as defined by duration and UV power comprises a cycle. In certain embodiments, a cycle repeats itself indefinitely. In a non-limiting example, one cycle may comprise a short, high power UV light (i.e., a flash), followed by a relatively longer period of relatively lower power UV light or no UV light. As used herein, "window" refers to any transparent or semi-transparent component through which light is passed.

The optical sensor and window apparatus may be utilized in underwater environments, such as underwater optical sensors, underwater cameras and underwater lights. They may also be used to expose deep sea environments to UV light, where such light would otherwise never be found. In addition to being used for biocidal applications, the window apparatus may be suitable for other related applications, such as curing materials extruded into the deep-water environment and forming structures needed outside of a vessel. Specifically, in certain embodiments, the apparatus may use less than 20 mW electrical power (continuous), preferably less than 10 mW (electrical, continuous) and even more preferably less than 5 mW (electrical, continuous). As used herein, continuous power refers to the energy consumed during all periods of one entire cycle divided by the duration of that entire cycle. These techniques are examples only, and not exhaustive.

Figure 1:
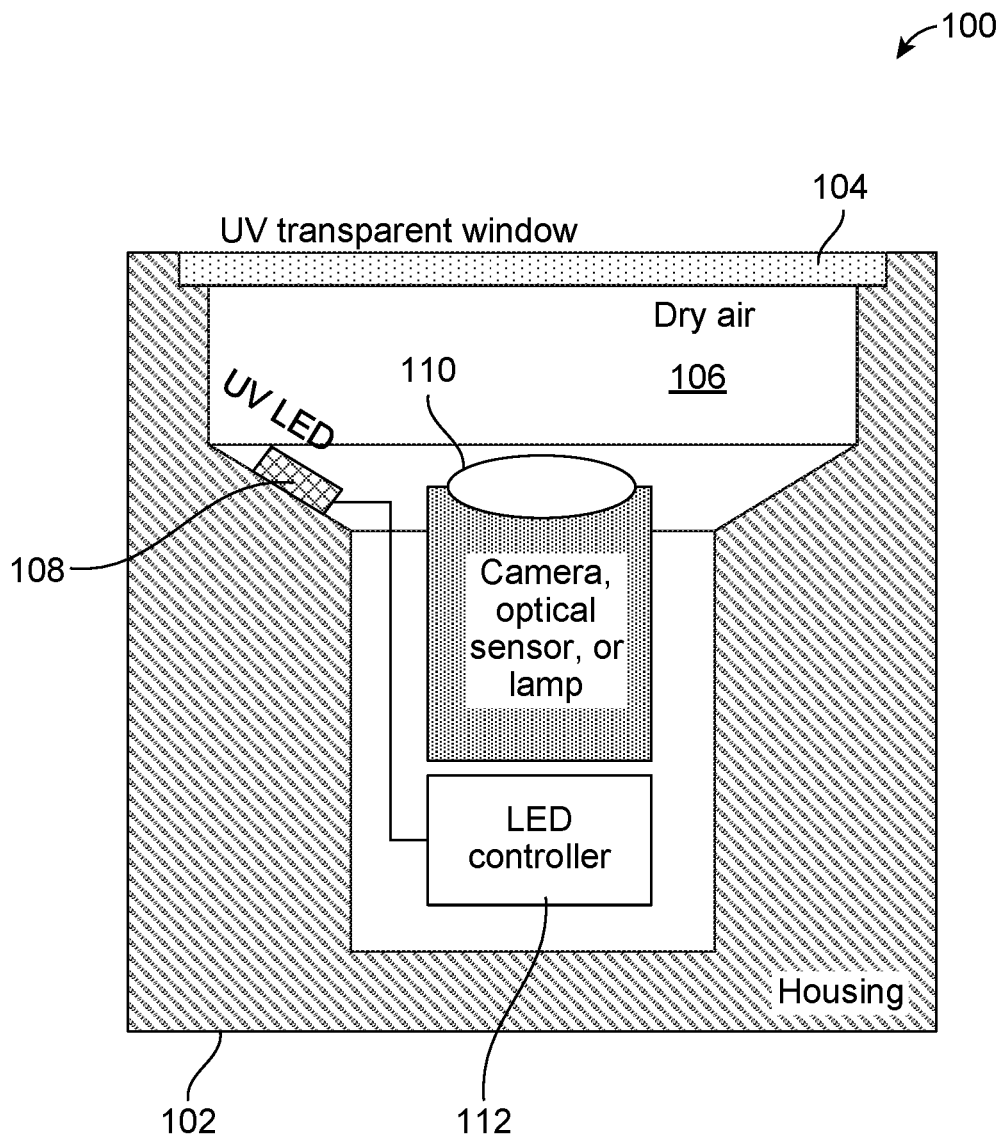
FIG. 1 is a block diagram of an example apparatus to prevent biofouling.

Referring to FIG. 1, an example apparatus 100 to prevent biofouling is shown. In an example, the apparatus includes a housing 102, a UV transparent window 104, a device cavity 106, one or more UV light emitting diodes (LEDs) 108, an optical device 110, and a controller 112. The housing 102 may be a cylindrical housing that is open on one end. Other shapes and configurations may also be used. In general, the housing 102 may be constructed from suitable materials to withstand an underwater environment and corresponding mechanical forces to which it will be subjected. The housing 102 includes the device cavity 106 configured to accommodate one or more optical devices 110. The cavity 106 may optionally be filled with dry air, substantially pure nitrogen, argon and/or other inert gas. The opening on the housing 102 is fitted with a leak-tight window 104 comprising one or more UV-transparent materials. The housing 102 includes an internal arrangement of one or more UV LEDs 108 configured to project light onto the window 104. In an example, the UV LEDs 108 are characterized by emission wavelengths of between 250-400 nm, preferably around 275 nm. In certain embodiments, individual UV LEDs 108 may be configured to emit the same or different wavelengths in the same apparatus. The UV LEDs 108 are operably coupled to a power source (not shown in FIG. 1) and the controller 112. Power source may be an internal source (e.g., a battery) or an external source (e.g., via a water-tight connector in the housing 102). Inductive charging (e.g., wireless) techniques may also be used to charge the internal battery.

The housing 102 further encloses one or more optical devices 110 and equipment as necessary for its application, such as a camera, an optical sensor, a lamp or simply the UV LEDs 108 only. The spatial arrangement of the UV LEDs 108 can be used to control the UV intensity distribution in the water-facing surface of the window. The intensity distribution can be designed depending on the intended use. For example, the UV intensity distribution is uniform across the window in some embodiments, while in other embodiments, the UV intensity is highest in the center of the window, while in still other embodiments, the UV intensity is highest around the window annulus.

The UV LEDs 108 are configured to irradiate the UV transparent window 104 from the inside of the housing 102.

That is, the UV LEDs 108 are orientated in the same general direction as the optical device 110 (e.g., both are directed toward an object). Additionally, in contrast to apparatuses of the prior art that project UV light from the outside of associated housings through water with attenuates UV light, the internal UV LED configurations of the present invention offer many advantages such as a reduction in energy consumption because UV light does not travel through water. The internal UV LEDs do not require external structures to support a light source, which may protrude from the outside surface of the housing and thus increase drag on an underwater apparatus. Further, the window 104 may be made flush with the surface of the housing 102 and the UV LEDs 108 can be installed inside the same watertight device cavity 106 that protects the optical devices 110 (e.g., cameras and other components within the apparatus), thus reducing complexity.

Figure 2:
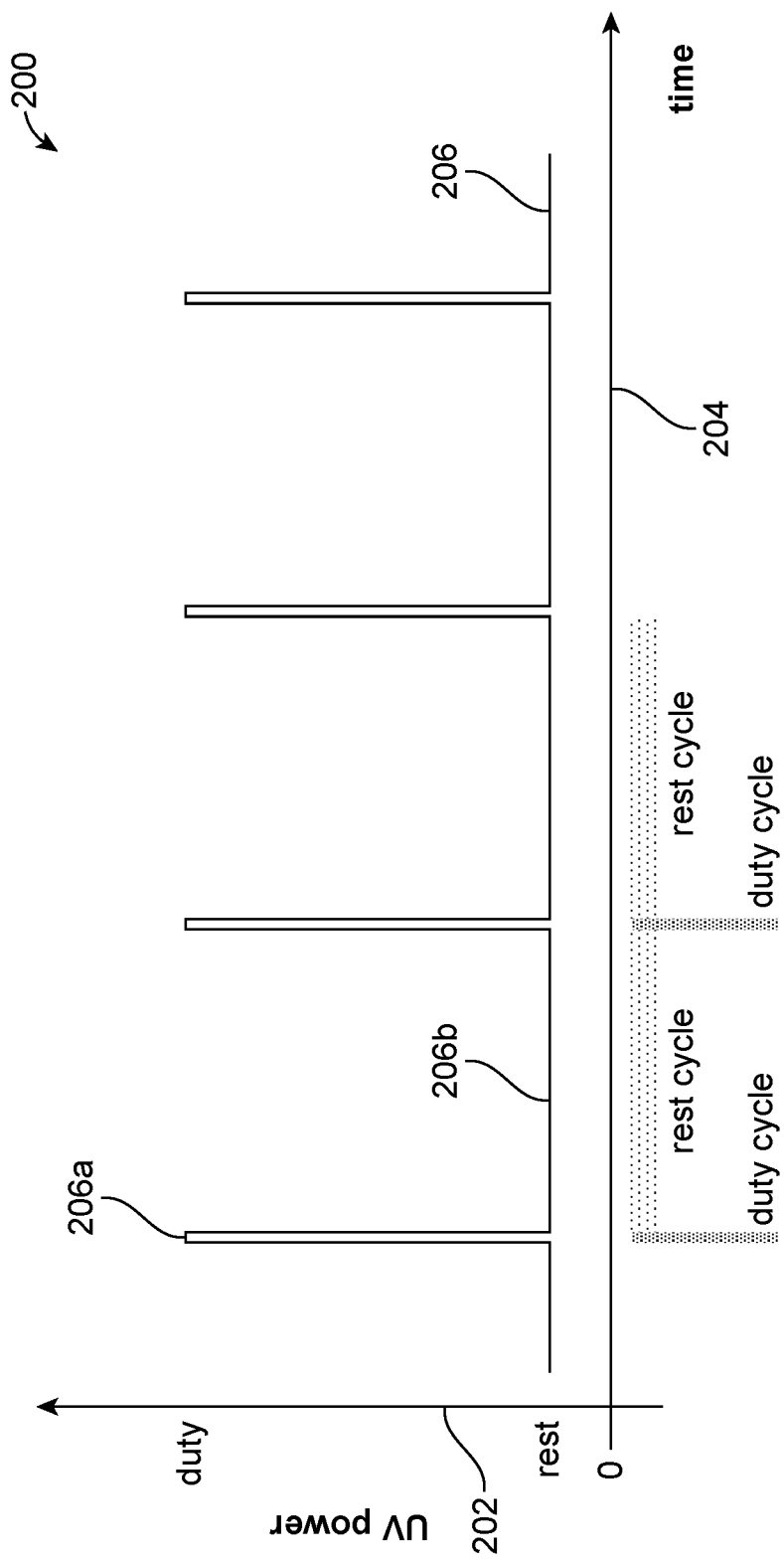
FIG. 2 is an example of a lamp duty cycle for the apparatus of FIG. 1.

Referring to FIG. 2, with further reference to FIG. 1, an example lamp duty cycle graph 200 is shown. The graph 200 includes a lamp power axis 202, a time axis 204 and a lamp power function 206. The UV LEDs 108 is/are driven by controller 112 that is configured to apply a timed sequence of power to the UV LEDs 108. The timed sequence may be a lamp power function 206 that includes a number of periods of varying power and duration, i.e., a complete cycle. In certain embodiments, the sequence is a period of relatively higher power 206a followed by a period of relatively lower power 206b, as schematically depicted in FIG. 2. The duration of the higher power period (e.g., duty period, flash) may be in a range from 0.01 seconds to 1,000 seconds. As an example, and not a limitation, the power applied during the duty period may be between 0.01× and 10.0× of the maximum rated continuous output of the UV LEDs 108, and the duration of the lower power period ("rest period") may range from 1 second to 100,000 seconds. The cycle profile— or the sequence of periods—may be tailored for specific marine biofouling environments. In an example, the power applied during the rest cycle is between 0.001× and 1.0× of the maximum rated continuous output of the LED. Commercially available UV LEDs (e.g., Klaran LED by Crystal-IS) may be rated at a maximum power of approximately 4 W (electrical, continuous). In an example, the controller 112 may be configured to provide a power function to each of the UV LEDs 108 individually, as a group, or combinations therein. The controller 112 may be configured to supply different lamp power functions to different UV LEDs 108 or different groups of UV LEDs 108.

Some effects of the interaction of the UV light with water are known to be biocidal (e.g. formation of ozone and hydrogen peroxide). The UV LEDs 108 generate(s) a high intensity of UV light energy at the window 104 surface in contact with seawater, thus producing a high concentration of biocidal chemical agents on and near the window surface.

In an embodiment, the UV transparent window 104 may be comprised of specialty window materials, which work together with the UV light to lower the UV dosage required for biofouling reduction or elimination. Such embodiments make use of windows that are substantially optically clear but have outer surfaces that are modified to contain atoms or compounds of metals such as silver, copper, tin and/or lead. The UV LEDs 108 activates biocidal effects in these metals, which do not leach into surrounding water. Thus, there is no environmental damage and no deterioration of the effect over time. In other embodiments, the water-facing surface of the window may be mechanically modified to provide additional anti-biofouling properties; such as, for example, being engraved with a micro pattern of a periodicity of 500 to 10,000 nm.

The controller 112 may include one or more processors and associated memory devices configured to provide a voltage signal to the UV LEDs 108. For example, the controller 112 may include a micro control unit (MCU) like an Attiny-85 by Microchip and suitable electronic components to control different temporal patterns and UV power settings to establish multiple irradiation modes for one or more UV LEDs 108. Example modes include continuous and pulsed UV irradiation. Under both such modes, the UV power can be selected. For example, flash intensity and duration values may be determined based on the marine environment. Similarly, rest intensity and duration values may be determined. The intensity and duration values may vary cycle to cycle and need not be constant (i.e., sinusoidal, sawtooth or other signal profiles may be used for the flash and rest periods). This allows adjustment for improved anti-biofouling results and energy economy. For example, pulsed irradiation with very high intensity pulses for short periods to use the lowest possible electrical power or as a special case where duty power and rest power are equal (e.g., continuous irradiation at intensity levels that prevent biofouling but still minimize the electrical power that is consumed). The controller 112 may be internal to the housing or external and coupled to the UV LEDs 108 via a waterproof coupler (not shown in FIG. 1).

The controller 112 may be configured to provide control for both the power and timing of all UV LEDs 108 individually or collectively. The apparatus may comprise several UV LEDs 108 of different wavelengths. The controller 112 may be configured to provide each individual UV LED 108 with its own individual control signal to enable a temporal light pattern.

In an example, the materials used to make the housing 102 may be electrically conductive, in which case the housing 102 can be used as an electrode for the UV LEDs 108. Example materials for the housing 102 include, but are not limited to, stainless-steel, copper, biocidally treated PVC, ABS and PE, ceramics such as SiN, Al2O3, BN, porcelain, glass and fiberglass. These materials may be treated to minimize biofouling, such as by coating or integration of anti-biofouling materials. For example, a stainless-steel housing could be copper clad. Polymer materials may be infused with nanoparticles that are known to prevent biofouling. Other anti-fouling techniques may also be used on the exterior surface of the housing 102.

Figure 3:
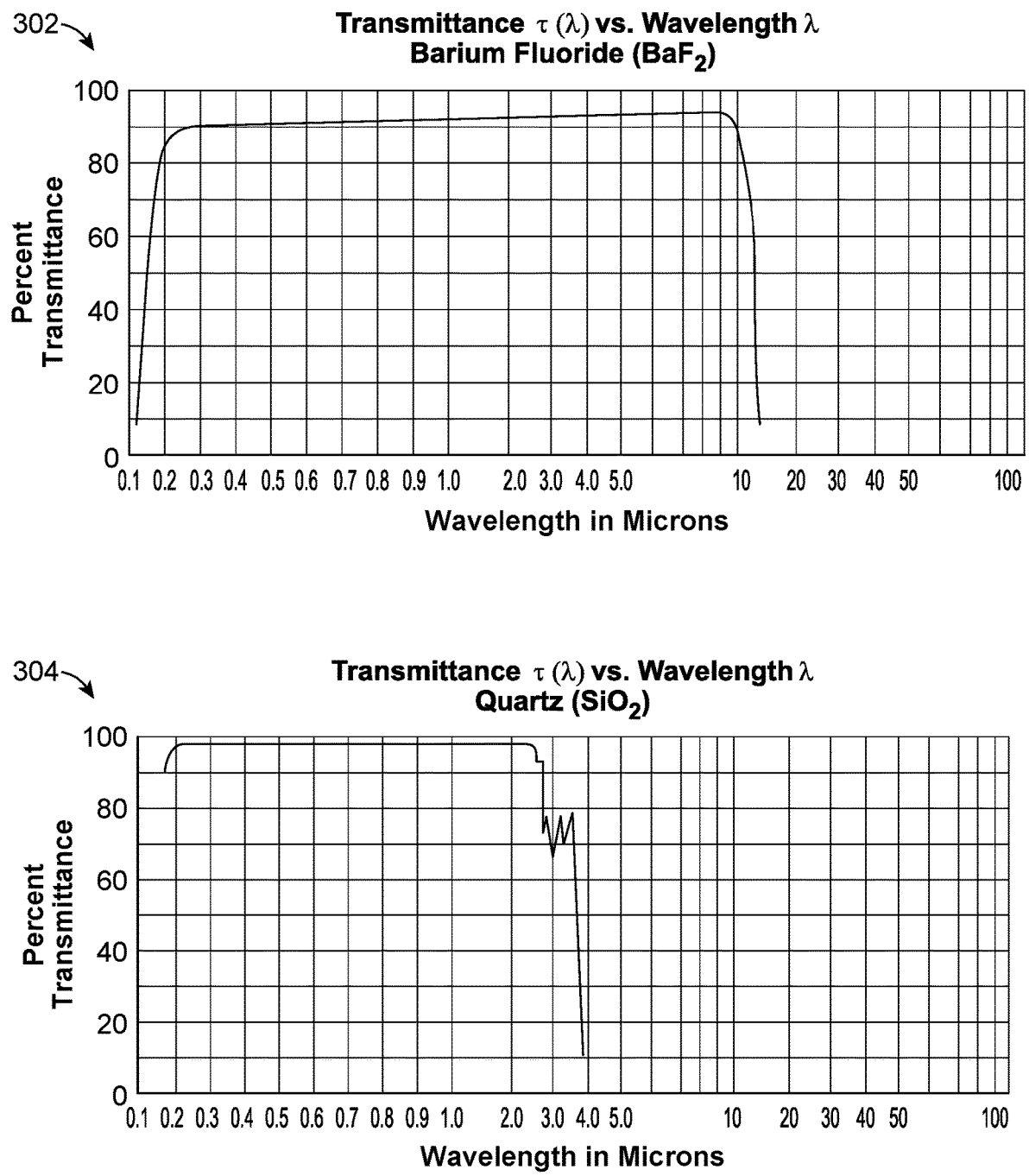
FIG. 3 includes transmittance graphs for example UV transparent windows.
Figure 3:
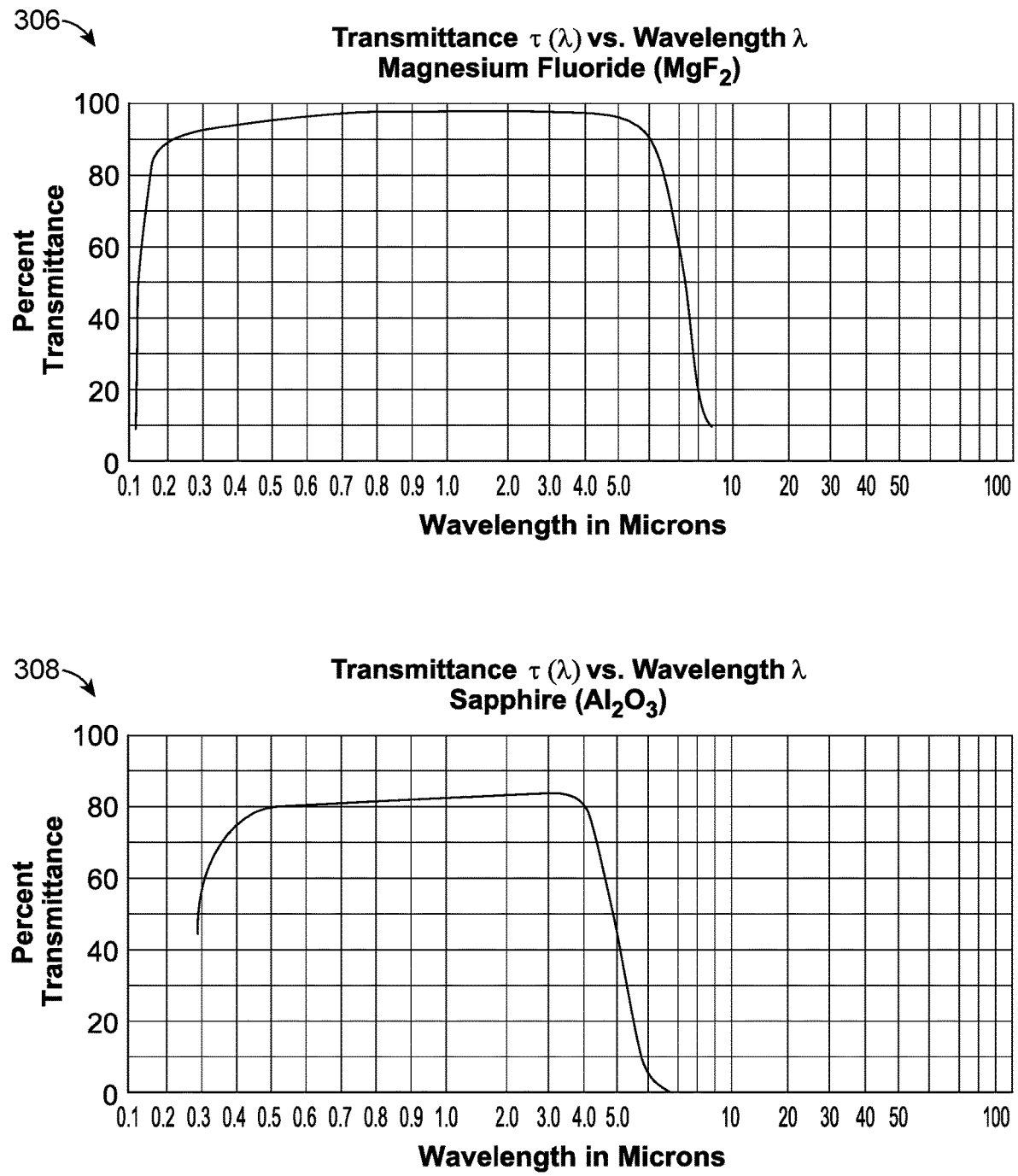

Referring to FIG. 3, transmittance graphs of example UV transparent windows is shown. The UV transparent window 104 may be constructed from materials such as, for example, sapphire, silicon carbide (SiC), diamond, zinc sulfide (ZnS), zinc selenide (ZnSe), Barium fluoride (BaF2), aluminum dioxide (Al2O3), quartz (SiO2), magnesium fluoride (MgF2), and other UV transparent materials. In an example, the UV transparent window 104 may be a composite of different materials such as the result of chemical or plasma vapor deposition process. The transmission properties of some of these materials are graphically illustrated in FIG. 3. A first graph 302 illustrates the transmittance versus wavelength for Barium Fluoride. A second graph 304 illustrates the transmittance versus wavelength for Silicon Dioxide. A third graph 306 illustrates the transmittance versus wavelength for Magnesium Fluoride. A fourth graph 308 illustrates the transmittance versus wavelength for Sapphire. A combination of these materials and/or multiple windows may be required for requisite mechanical strength for deep sea applications. Generally, the embodiments of the UV transparent window 104 are characterized by mechanical strengths suitable for water pressures from 0 to 100 MPa (0-10,000 m water column). Thick windows from water soluble material like MgF2 with high UV transparency and adequate mechanical strength may be combined with a thin sapphire or quartz protective window. In an example, a hydrophobic coating (e.g., Al2O3) may be applied to the exterior of the UV transparent window 104 to help reduce biofouling. In an example, the exterior coating on the UV transparent window 104 may be the result of an atomic layer deposition process to produce an atomically smooth surface in an effort to reduce biofouling on the exterior surface.

Figure 4A:
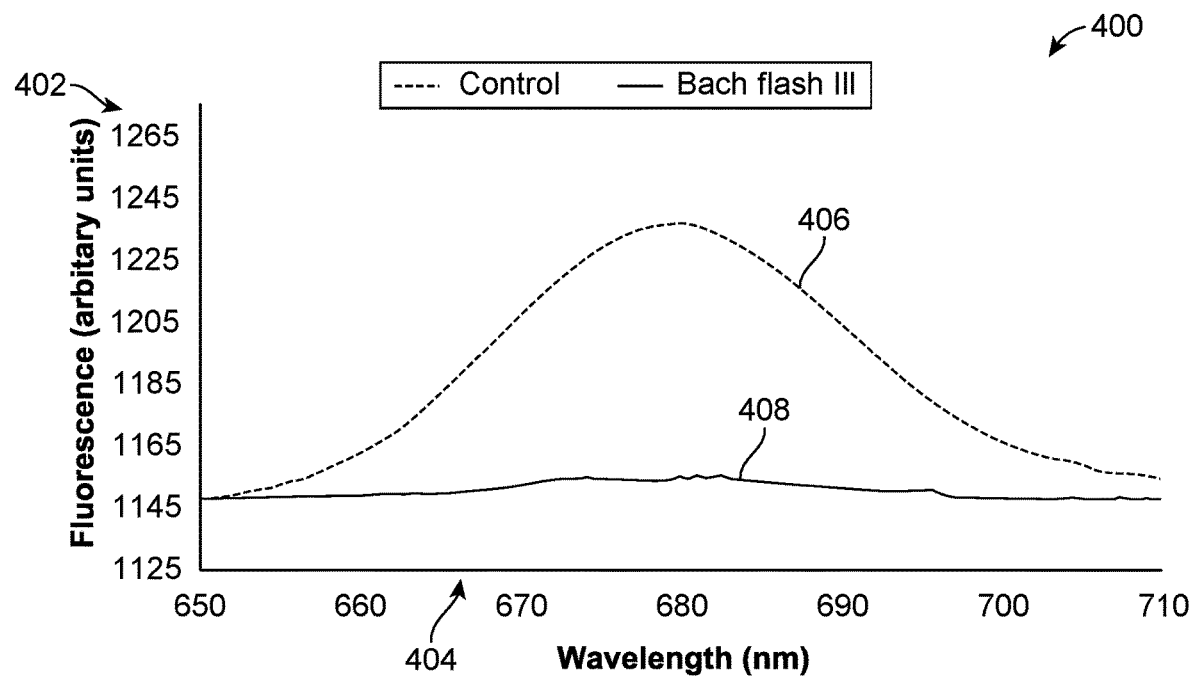
FIGS. 4A and 4B are example results of chlorophyll buildup and prevention.

Referring to FIG. 4A, with further reference to FIGS. 1 and 2, example results of chlorophyll buildup and prevention are shown. A first test results graph 400 includes a fluorescence axis 402, a light wavelength axis 404, a first control curve 406, and a results curve 408. The fluorescence axis 402 is expressed in arbitrary units to show the fluorescence emission intensity of chlorophyll buildup on a control window in an underwater marine environment. In an example, the apparatus 100 may be used as a fouling resistant fluorometer. That is, the optical sensor 110 may be configured to measure the fluorescence of seawater and the control curve 406 and the results curve 408 represent measure of fluorescence at the indicated wavelengths. The control curve 406 shows the results of a window placed in a marine environment that was not irradiated by a UV source. The control curve 406 indicates the formation of chlorophyll (e.g., the appearance of the chlorophyll emission) on the control window material. The formation of chlorophyll is an early indicator for the onset of biofouling, because biofouling communities include algae and cyanobacteria that produce chlorophyll. In comparison, the results curve 408 illustrates the results of illuminating an identical window in the same marine environment as the control window with the UV LEDs 108. The results curve 408 indicates the absence of chlorophyll formation on the window that was irradiated with 40 mW (285 UV) (400 mA) for 0.1 sec—the flash intensity and duration 206a—followed by darkness (or 10e-12 mW for the low intensity cycle) for 19.9 sec—the rest intensity and duration 206b. Summation of the energies used during the periods and division by the sum of durations of the periods provides the equivalent of 200 microwatt—of 285 UV continuous or—considering an electrical to UV conversion efficiency of 1% of state-of-the-art UV LEDs—20 mW electrical continuous.

Figure 4B:
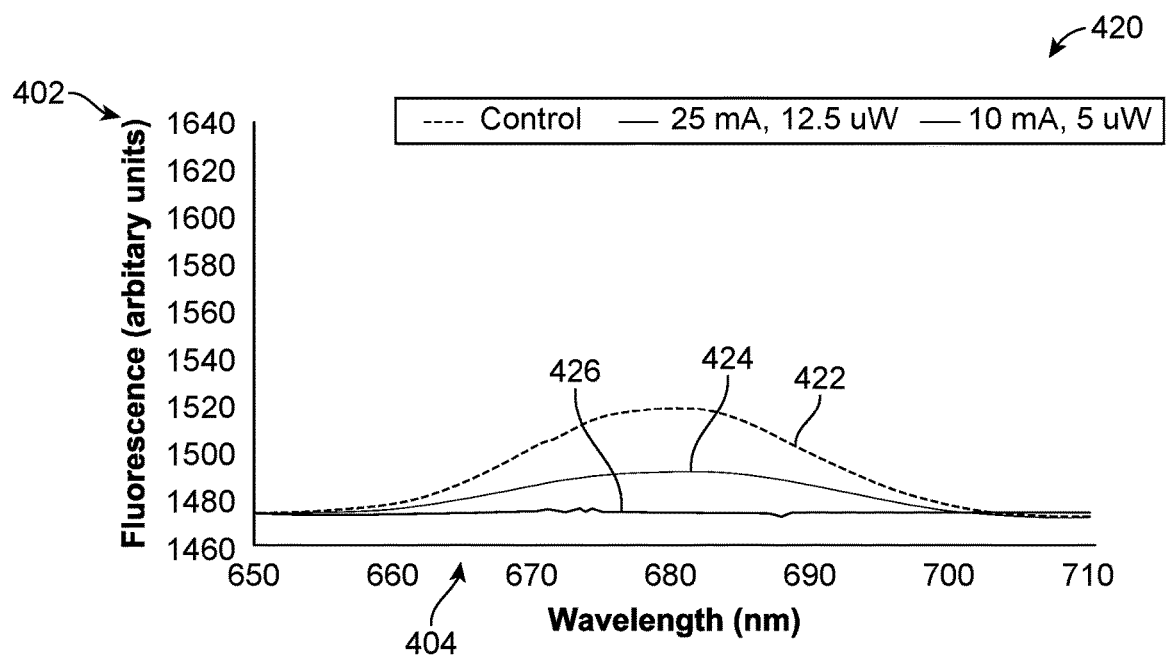

Referring to FIG. 4B, with further reference to FIGS. 1 and 2, example results of chlorophyll buildup and prevention are shown. A second test results graph 420 includes the fluorescence axis 402, the light wavelength axis 404, a second control curve 422, a 5-microwatt results curve 424, and a 12.5-microwatt results curve 426. The control curve 422 shows the results of a window placed in a marine environment that was not irradiated by a UV source. The control curve 422 indicates the formation of chlorophyllon the control window material. (by the appearance of the chlorophyll emissionspectrum) The 5-microwatt results curve 424 and the 12.5-microwatt results curve 426 illustrates the results of illuminating an identical window in the same marine environment as the control window with the UV LEDs 108. The 5-microwatt continuous (averaged) results curve 424 indicates a relatively less amount of chlorophyll formation on a window that was irradiated with 1 mW (285 UV) (10 mA current) for 0.1 sec (e.g., the flash intensity and duration 206a), followed by darkness (or 10e-12 mW for the low intensity cycle) for 19.9 sec (e.g., the rest intensity and duration 206b). The 12.5-microwatt continuous (averaged) results curve 426 indicates no amount of chlorophyll formation on a window that was irradiated with approximately 2.5 mW (285 UV) (25 mA current) for 0.1 sec followed by darkness of 19.9 sec, or 12.5 µW integrated UVC. The 12.5-microwatt results curve 426 illustrates that a virtual elimination of biofouling may be achieved with much less power as required by other light-based biofouling solutions and as expected by those skilled in the art. The flash and rest intensity and duration values are examples only as other values may be used based on the marine environment and operational application of the apparatus 100.

Figure 5:
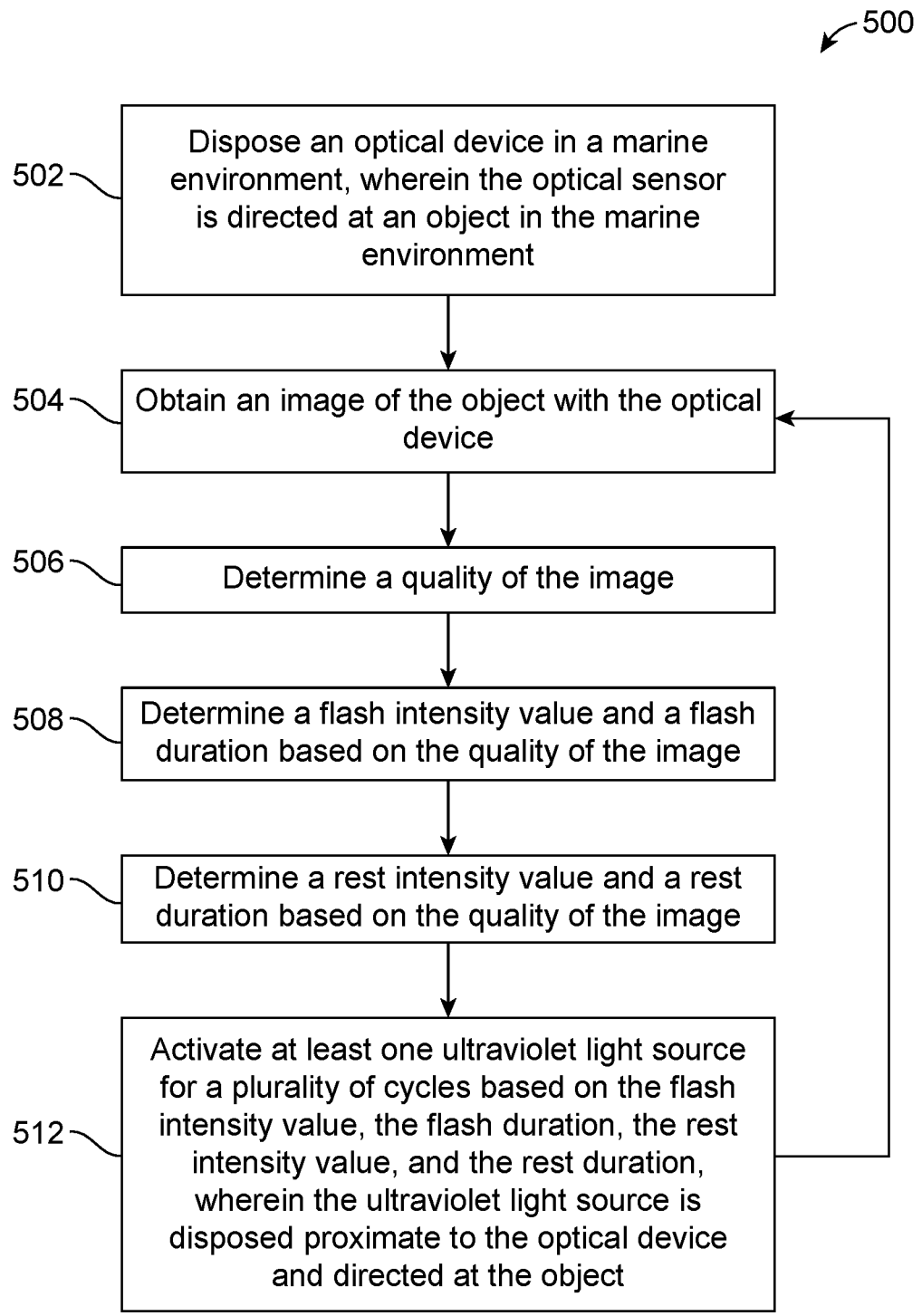
FIG. 5 is an example process diagram for a method of determining a lamp duty cycle.

Referring to FIG. 5, with further reference to FIGS. 1-4B, a method 500 of determining a lamp duty cycle includes the stage shown. The method 500 is, however, an example only and not limiting. The method 500 may be altered, e.g., by having stages added, removed, rearranged, combined, performed concurrently, and/or having single stages split into multiple stages. For example, stages 508 and 510 for determining the flash and rest intensity and duration values may be combined into a single stage. Still other alterations to the method 500 as shown and described are possible.

At stage 502, the method includes disposing an optical device in a marine environment, such that the optical device is directed at an object in the marine environment. The optical device 110 may be located within the device cavity 106 in the housing 102 and behind the UV transparent window 104. In an example, the optical device 110 may be capable of movement within the cavity 106 thus optical device 110 may be directed along a different axis than the housing 102. The housing 102 may include multiple UV transparent windows 108 at different orientations (e.g., on different planes) and the optical device 110 may be configured to align with each of the different orientation to obtain an image through the windows. The object in the marine environment may be a visual test pattern, quick response code, bar code, or other object with known dimensions or visual features. In an example, the object may be a reflector or a constant light source. In some installations, the object may be part of the environment such as a coral formation, or a man-made object such as an anchor chain or cable. In general, the object is used as a reference to compare image quality over a period of time.

At stage 504, the method includes obtaining an image of the object with the optical device. The optical device 110 may be a camera or other sensor configured to obtain and store an electronic representation of the object. The representation of the object may be stored in a memory within the optical device 110, the controller 112, or other device within or external to the housing 102. In an example, the image may persist in a computerized file formats such as raw formats (e.g., camera image file format (CIFF), digital negative (DNG), etc.), raster formats (e.g., joint photographic experts group (JPEG), tagged image file format (TIFF), graphics interchange format (GIF), bitmap (BMP), portable network graphics (PNG), etc.), stereo formats (e.g., portable network graphics (PNS), multi picture object (MPO), etc.), or other electronic formats that are suitable for use in objective image quality algorithms.

At stage 506, the method includes determining a quality of the image. The controller 112, or other computer system, may be configured to execute one or more objective methods to determine a quality of the image obtained at stage 504. For example, full-reference and reduced-reference methods may be used based on a previously obtained or stored image of the object. No-reference methods may also be used to determine the quality of image without reference to a prior image. The quality of the image may be based on a sharpness value associated with contrast boundaries in an image. Example of image sharpness quality measures include cumulative probability detection (CPBD) and just noticeable blur (JNB). The image quality measure may be based on a frequency domain image blur measure. Other objective image quality algorithms may be used to determine a quality of the image of the object. The quality of the image may be compared to a previously determined threshold value to determine whether or not the image quality is operationally acceptable. That is, a low-quality image may be an indication of a potential increase in biofouling on the exterior surface of the UV transparent window 104. The image quality may be used to modify the control signal provided to the UV LEDs 108.

At stage 508, the method includes determining a flash intensity value and a flash duration based on the quality of the image. The controller 112, or other computer system, may be configured to modify the power signal provided to the UV LEDs 108. In an example, a look-up table or other data structure may include one or more tables to correlate one or more image quality values with flash intensity and duration values (e.g., the period of relatively higher power 206a). For example, in response to a low-quality image obtained at stage 504, the controller 112 may increase the intensity value of the flash (e.g., provide a high-power flash), increase the duration of flash (e.g., a longer active time), or a combination of both. In an example, the flash intensity value may be between 10 mW and 100 mW, and the flash duration may be between 0.01 seconds and 1000 seconds.

At stage 510, the method includes determining a rest intensity value and a rest duration based on the quality of the image. The controller 112, or other computer system, may be configured to modify the power signal provided to the UV LEDs 108. In an example, a look-up table or other data structure may include one or more tables to correlate one or more image quality values with rest intensity and duration values (e.g., the period of relatively lower power 206b). For example, in response to a low-quality image obtained at stage 504, the controller 112 may increase the intensity value of the rest power (e.g., provide a lower rest lamp intensity), decrease the duration of rest period (e.g., increase the rate of flashes), or a combination of both. In an example, a look-up table or other function may be used to determine a combination of flash intensity, flash duration, rest intensity and rest duration (e.g., the lamp power function 206) based on the image quality. The lamp power function 206 need not be limited to impulse signals (e.g., flashes) as other power profiles may be used (e.g., stepped functions, saw-tooth, quick pulses, etc.). The lamp power function 206 may be based on more than one image quality calculation. For example, multiple image quality calculations may be used to determine a rate of image quality degradation, and the lamp power function 206 may be based on the rate of image quality degradation. The objective of changing the lamp power function 206, including the flash and rest periods, is to retard the rate of biofouling and/or possibly reduce the amount of accumulated biofouling.

At stage 512, the method includes activating at least one ultraviolet light source for a plurality of cycles based on the flash intensity value, the flash duration, the rest intensity value, and the rest duration, wherein the ultraviolet light source is disposed proximate to the optical device and directed at the window. The controller 112 is configured to provide one or more lamp power functions 206 to one or more of the UV LEDs 108 disposed within the cavity 106. The UV LEDs 108 are directed toward the UV transparent window 104 and thus in the direction of the object. The proximity of the UV LEDs 108 to the optical device 110 and the UV transparent window 104 enables a reduction of lamp power to achieve a reduction in biofouling as compared to externally mounted lamps because the emitted UV energy is not absorbed by intervening seawater. The number of cycles may be based on an expected results time period. For example, the UV LEDs 108 may be activated based on the determined flash intensity value, the flash duration, the rest intensity value, and the rest duration for a period of minutes, hours, days, weeks. After a plurality of cycles, the method includes obtaining another image at stage 504 and iterating through the method 500 again. In an example, the optical device 110 may be configured to enter a dark mode (e.g., not active) or a shutter down mode (e.g., closing the optical path) when the UV LEDs 108 are activated.

In an example, the apparatus 100 may be included in a network including a plurality of similar apparatuses. The network may include optical devices in a relatively small operational area (e.g., harbor, offshore oil rig) or a larger network (e.g., ocean region). Each of the apparatuses 100 may be configured to send and receive lamp power functions 206 to one or more network servers/data storage devices. In an example, the controller 112 may include a communication module configured to send and receive wired or wireless communication packets (e.g., ethernet, WiFi, BLUETOOTH, near-field communication technologies, infrared, UV, and visible light communication, etc.). In such a networked environment, the lamp power functions 206 may be crowdsourced such that particularly effective lamp power functions 206 determined on one apparatus may be stored on one or more networked servers and then propagated to other devices on the network. An effective lamp power function 206 may be evaluated based on a steady or slowly decreasing image quality. The effectiveness of a particular lamp power function 206 may be evaluated based on the geographic location of the reporting apparatus (i.e., some lamp power functions may be more effective in certain areas). The design of the apparatus 100 enables the transfer of power lamp functions across a network of similar system because the UV LED 108 is located within the cavity 106 for each apparatus 100 in the network. That is, the present design reduces the possibility of non-linear effects caused by the seawater located between a window and UV source as may occur in the prior art.

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C," or "A, B, or C, or a combination thereof" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system. The apparatus 100 may be operably coupled to one or more processors via a wired and/or wireless connections.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected, coupled (e.g., communicatively coupled), or communicating with each other are operably coupled. That is, they may be directly or indirectly, wired and/or wirelessly, connected to enable signal transmission between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

"About" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Further, more than one invention may be disclosed.

The invention claimed is:

1. A method for reducing biofouling in a marine environment, comprising:
    disposing an optical device in the marine environment, wherein the optical device is directed at an object in the marine environment;
    obtaining an image of the object with the optical device;
    determining a quality of the image;
    determining a flash power value and a flash duration based on the quality of the image;
    determining a rest power value and a rest duration based on the quality of the image; and
    activate at least one ultraviolet light source for a plurality of cycles based on the flash power value, the flash duration, the rest power value and the rest duration, wherein the at least one ultraviolet light source is disposed proximate to the optical device and directed at the object.

2. The method of claim 1 wherein the at least one ultraviolet light source is characterized by emission wavelength of between 250 nanometers and 400 nanometers.

3. The method of claim 1 wherein the flash duration is between 0.01 seconds and 1000 seconds.

4. The method of claim 1 wherein the flash power value is between 1 milliwatt and 100 milliwatts.

5. The method of claim 1 wherein the rest power value is less than 1 milliwatt.

6. The method of claim 1 wherein the rest duration is between 1 second and 100,000 seconds.

7. The method of claim 1 wherein the flash power value is approximately 12.5 milliwatts, the flash duration is approximately 0.1 seconds, the rest power value is less than 0.001 milliwatts, and the rest duration is approximately 19.9 seconds.

8. The method of claim 1 wherein determining the quality of the image is based on a sharpness value associated with a contrast boundary in the image.

9. The method of claim 1 further comprising providing the flash power value, the flash duration, the rest power value and the rest duration to a server.

10. The method of claim 1 further comprising receiving the flash power value, the flash duration, the rest power value and the rest duration from a server.

11. An apparatus for reducing biofouling in a marine environment, comprising:
    a housing including a cavity and an ultraviolet transparent window disposed over the cavity;
    an optical device disposed in the cavity and directed towards the ultraviolet transparent window;
    one or more ultraviolet light emitting diodes disposed in the cavity and directed toward the ultraviolet transparent window; and
    a controller operably coupled to the one or more ultraviolet light emitting diodes and configured to provide at least one lamp power function to the one or more ultraviolet light emitting diodes, wherein the at least one lamp power function is based on at least a flash power value, a flash duration, a rest power value and a rest duration.

12. The apparatus of claim 11 wherein the ultraviolet transparent window is constructed at least in part with at least one material selected from a group consisting of sapphire, silicon carbide (SiC), diamond, zinc sulfide (ZnS), zinc selenide (ZnSe), Barium fluoride (BaF2), aluminum dioxide (Al2O3), quartz (SiO2), and magnesium fluoride (MgF2).

13. The apparatus of claim 11 wherein at least one of the one or more ultraviolet light emitting diodes are characterized by emission wavelengths between 250 nanometer and 400 nanometers.

14. The apparatus of claim 11 further comprising a power source operably coupled to the one or more ultraviolet light emitting diodes.

15. The apparatus of claim 11 wherein the controller is configured to receive the at least one lamp power function from a remote server.

16. The apparatus of claim 11 wherein the controller includes at least one data structure configured to store the at least one lamp power function.

17. The apparatus of claim 11 wherein the flash duration is between 0.01 seconds and 1000 seconds and the flash power value is between 1 milliwatt and 100 milliwatts.

18. The apparatus of claim 11 wherein the rest power value is less than 1 milliwatt and the rest duration is between 1 second and 100,000 seconds.

19. The apparatus of claim 11 wherein the flash power value is approximately 12.5 milliwatts, the flash duration is approximately 0.1 seconds, the rest power value is less than 0.001 milliwatts, and the rest duration is approximately 19.9 seconds.

20. An apparatus, comprising:
    a housing means including a cavity configured to enclose one or more optical device means and one or more ultraviolet light emitting means;
    an ultraviolet transparent window means disposed on the housing means over the cavity, wherein the one or more optical device means and the one or more ultraviolet light emitting means are directed towards the ultraviolet transparent window means; and
    a controller means operably coupled to the one or more ultraviolet light emitting means and configured to provide at least one lamp power function to the one or more ultraviolet light emitting means, wherein the at least one lamp power function is based on at least a flash power value, a flash duration, a rest power value and a rest duration.

\* \* \* \* \*